UNITED STATES PATENT OFFICE

RAINALD BRIGHTMAN, OF BLACKLEY, MANCHESTER, ENGLAND, ASSIGNOR TO IMPERIAL CHEMICAL INDUSTRIES LIMITED, OF WESTMINSTER, ENGLAND

DYEING OF REGENERATED CELLULOSE MATERIALS

No Drawing. Application filed February 19, 1930, Serial No. 429,807, and in Great Britain February 13, 1929.

According to the present invention the disazo dyes, some of which are new, obtained by tetrazotizing 1:5-diaminonaphthalene and coupling with one molecule of a phenol or naphthol or a carboxylic or sulphonic derivative thereof or an aminonaphthol sulphonic acid and one molecule of another coupling component, other than 2-amino-5-naphthol-7-sulphonic acid or a derivative thereof, are applied to the dyeing of a regenerated cellulose rayon, for instance, viscose rayon in even shades. For the production of the best results there must be present in the dyestuff molecule at least one sulphonic acid group for each napthalene nucleus combined as a coupling component.

The dyestuffs applicable in my invention may all be represented by the general formula

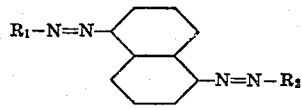

wherein $R_1$ represents the coupled residue of an aminonaphthol sulphonic acid, a cresotinic acid, a naphthol-sulphonic acid or a naphthol and $R_2$ represents the coupled residue of an amino naphthalene sulphonic acid, a naphthol-sulphonic acid or an aminonaphthol sulphonic acid, said dyestuff being free from coupled residues of 2-amino-5-naphthol-7-sulphonic acid and advantageously containing at least one sulphonic group in the molecule for each naphthalene nucleus combined as a coupling component. In the terms aminonaphthol sulphonic acid and aminonaphthalene sulphonic acid, I include the alkyl and aryl N-substituted derivatives of such compounds, that is, the alkyl-amino and aryl-amino substituted compounds of naphthol and naphthalene sulphonic acids.

These disazo dyestuffs may also be represented by the following structural formula

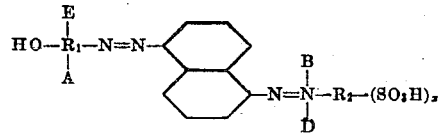

wherein $R_1$ represents a benzene or naphthalene residue, $R_2$ represents a naphthalene residue, A represents hydrogen, COOH or $SO_3H$ groups, B represents hydrogen or an OH group, D and E represent hydrogen or an amino group, and $x$ is one or two, the said dyestuffs being free from coupled residues of 2-amino-5-naphthol-7-sulphonic acid. Dyestuffs of the above type in which both $R_1$ and $R_2$ represent naphthalene residues and A is hydrogen or $SO_3H$, and containing at least two sulphonic acid groups are advantageous.

Symmetrical disazo dyes obtained from 1:5-diaminonaphthalene have already been described as substantive dyes for cotton (compare, for instance, German specification 39,954) but it is well known that most of the direct cotton dyestuffs give unsatisfactory results when applied to the production of even shades on viscose rayon and it could not have been foreseen that the dyestuffs we describe would have the valuable property of dyeing a regenerated cellulose rayon in even shades. In British specification 9,287/1900 mordant colours for wool, are described which are obtained by using 1 molecule of 1:5-naphthalenediamine and one molecule of salicylic acid and one molecule of other coupling components, but it could not be anticipated from this specification that such dyes would give level shades on viscose rayons. My invention, while including the new application of the dyes of No. 9,287/1900 is not restricted to these, nor is it dependent on the presence in the dyestuff molecule of a group or groups capable of chrome or mordant treatment.

My invention is illustrated but not limited by the following examples, in which the parts are by weight.

*Example 1.*—158 parts of 1:5-diaminonaphthalene are tetrabotized in the known manner with 600 parts of 36 per cent hydrochloric acid and 138 parts of sodium nitrite and the tetrazo-solution is stirred into a well cooled solution of 319 parts of 1:8-aminonaphthol-2:4-disulphonic acid containing 750 parts of sodium carbonate. The mixture is stirred until combination is complete, when there is added a solution of 144 parts of β-naphthol in 40 parts of sodium hydroxide.

The mixture is maintained alkaline and stirred until coupling is complete when it is heated up and the dyestuff isolated by the addition of common salt. It dyes viscose rayon a bright blue shade.

*Example 2.*—The dyebath is made up from 3000 parts of water, 20 parts of Glauber's salt, 3 parts of soap and 2 parts of the dyestuff obtained by combining 1 mol. of tetrazotized 1:5-diaminonaphthalene with 1 mol. of salicylic acid and 1 mol. of 2-methylaminonaphthalene-7-sulphonic acid in presence of sodium carbonate. 100 parts of viscose rayon are entered into the bath warm and the bath is then heated nearly to the boil and the dyeing carried on for about ¾ hour. The fabric is then removed, rinsed and dried. Alternatively the rayon may be entered into the bath nearly at the boil and the bath allowed to cool gradually during the dyeing. Moreover borax or other salts or dyeing assistants may also be added to the dyebath. The rayon is dyed a rich red shade.

The invention is further illustrated by the examples given in the following table:

| 1:5-diaminonaphthalene tetrazotized and coupled with— | | Shade on viscose rayon |
| --- | --- | --- |
| A. 1 mol. of— | B. 1 mol. of— | |
| 1:8-aminonaphthol-2:4-disulphonic acid | 1:8-aminonaphthol-2:4-disulphonic acid | Bright blue |
| 1:5-naphtholsulphonic acid | 1:5-naphtholsulphonic acid | Violet-brown |
| Salicylic acid | 2-amino-8-naphthol-6-sulphonic acid | Reddish-brown |
| Salicylic acid | 2-phenylamino-8-naphthol-6-sulphonic acid | Dark brown |
| o-cresotinic acid | 2-amino-8-naphthol-6-sulphonic acid | Reddish-brown |
| p-cresotinic acid | 2-amino-8-naphthol-6-sulphonic acid | Maroon |
| Salicylic acid | 1:8-aminonaphthol-2:4-disulphonic acid | Reddish-blue |
| 1:4-naphtholsulphonic acid | 2-amino-8-naphthol-6-sulphonic acid | Violet |
| 1:4-naphtholsulphonic acid | 1:8-aminonaphthol-4-sulphonic acid | Violet |
| Salicylic acid | 1:8-aminonaphthol-3:6-disulphonic acid | Brownish-violet |

Having now particularly described and ascertained the nature of my said invention and in what manner the same is to be performed, I declare that what I claim is:—

1. The process of dyeing regenerated cellulose material in even level shades, which comprises applying to said regenerated cellulose materials from a dye-bath, disazo dyes having the following structural formula

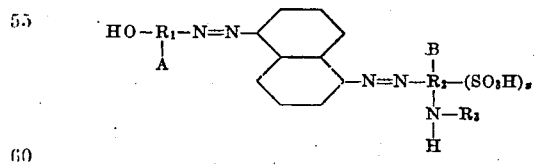

wherein $R_1$ represents a benzene or naphthalene residue, A represents hydrogen, COOH or $SO_3H$ group, $R_2$ represents a naphthalene residue, B represents hydrogen or an OH group, $R_3$ represents hydrogen, an alkyl group or a phenyl residue and $x$ is one or two, said dyestuff being free from coupled residues of 2-amino-5-naphthol-7-sulphonic acid, thereby dyeing said materials in even level shades, the said disazo dyestuffs being obtainable by tetrazotizing 1:5-diaminonaphthalene and coupling with azo dye coupling components to give the said structure.

2. A process according to claim 1 in which the dyestuffs used contain a sulphonic acid group or groups, there being at least one sulphonic group present for each naphthalene nucleus represented by $R_1$ and $R_2$, the said sulphonic acid group or groups being attached to the said naphthalene residues represented by $R_1$ or $R_2$.

3. In the dyeing of regenerated cellulosic materials in even level shades, the process which comprises applying to said regenerated cellulosic materials dyestuffs which may be represented by the probable formula

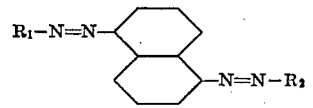

wherein $R_1$ represents the coupled residue of an aminonaphthol sulphonic acid, salicylic acid, a cresotinic acid, a naphtholsulphonic acid or a naphthol and $R_2$ represents the coupled residue of an aminonaphthalene sulphonic acid, a naphthol sulphonic acid or an aminonaphthol sulphonic acid, the said dyestuff being free from coupled residues of 2-amino-5-naphthol-7-sulphonic acid.

4. In the dyeing of regenerated cellulosic materials in even level shades, the process which comprises applying to said regenerated cellulosic materials dyestuffs which may be represented by the probable formula

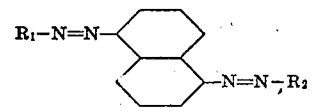

wherein $R_1$ represents the coupled residue of an aminonaphthol sulphonic acid, salicylic acid, a cresotinic acid, a naphtholsulphonic acid or a naphthol and $R_2$ represents the coupled residue of an aminonaphthalene sulphonic acid, a naphtholsulphonic acid or an aminonaphthol sulphonic acid, the said dyestuff having at least one sulphonic group present in the molecule for each naphthalene nucleus combined as a coupling component and being free from coupled residues of 2-amino-5-naphthol-7-sulphonic acid.

5. In the dyeing of regenerated cellulosic materials in even level shades, the process which comprises applying to said regenerated cellulosic materials dyestuffs which may be represented by the probable formula

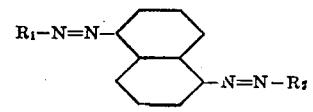

wherein $R_1$ represents the coupled residue of salicylic acid, a cresotinic acid or β-naphthol and $R_2$ represents the coupled residue of an aminonaphthol sulphonic acid, the said dyestuff being free from coupled residues of 2-amino-5-naphthol-7-sulphonic acid.

6. In the dyeing of regenerated cellulosic materials in even level shades, the process which comprises applying to said regenerated cellulosic materials dyestuffs which may be represented by the probable formula

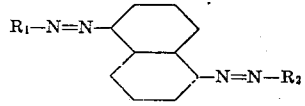

wherein $R_1$ represents the coupled residue of β-naphthol and $R_2$ represents the coupled residue of 1:8-aminonaphthol-2:4-disulphonic acid.

7. Regenerated cellulosic materials dyed with a disazo dye having the probable formula

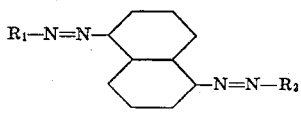

wherein $R_1$ represents the coupled residue of an aminonaphthol sulphonic acid, salicylic acid, a cresotinic acid, a naphtholsulphonic acid or a naphthol and $R_2$ represents the coupled residue of an aminonaphthalene sulphonic acid, a naphtholsulphonic acid or an aminonaphthol sulphonic acid, said disazo dye being free from coupled residues of 2-amino-5-naphthol-7-sulphonic acid.

8. Regenerated cellulosic materials dyed with a disazo dye having the probable formula

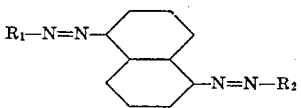

wherein $R_1$ represents the coupled residue of an aminonaphthol sulphonic acid, salicylic acid, a cresotinic acid, a naphtholsulphonic acid or a naphthol and $R_2$ represents the coupled residue of an aminonaphthalene sulphonic acid, a napththolsulphonic acid or an aminonaphthol sulphonic acid, the said dyestuff having at least one sulphonic group present in the molecule for each naphthalene nucleus obtained as a coupling component and being free from coupled residues of 2-amino-5-naphthol-7-sulphonic acid.

9. Regenerated cellulosic materials dyed with a disazo dye having the probable formula

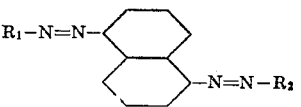

wherein $R_1$ represents the coupled residue of salicylic acid, a cresotinic acid or β-naphthol and $R_2$ represents the coupled residue of an aminonaphthol sulphonic acid, the said disazo dye being free from coupled residues of 2-amino-5-naphthol-7-sulphonic acid.

10. Regenerated cellulosic materials dyed with a disazo dye having the probable formula

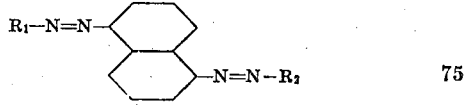

wherein $R_1$ represents the coupled residue of β-naphthol and $R_2$ represents the coupled residue of 1:8-aminonaphthol-2:4-disulphonic acid.

11. The process of dyeing regenerated cellulose materials in even level shades, which comprises applying to said regenerated cellulose materials from a dyebath, disazo dyes having the following structural formula

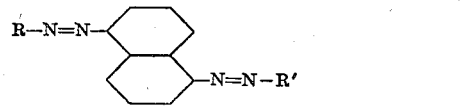

wherein R represents the coupled residue of an azo dye coupling component of the class consisting of beta-naphthol, salicylic acid, ortho cresotinic acid, para cresotinic acid, 1:5-naphthol sulphonic acid, 1:4-naphtholsulphonic acid and 1:8-aminonaphthol-2:4-disulphonic acid, and R′ represents the coupled residue of an azo dye coupling component of the class consisting of 1:8-aminonaphthol-2:4-disulphonic acid, 1:8-aminonaphthol-3:6-disulphonic acid, 1:8-aminonaphthol-4-sulphonic acid, 2-amino-8-naphthol-6-sulphonic acid, 2-phenylamino-8-naphthol-6-sulphonic acid, 2-methylaminonaphthalene-7-sulphonic acid and 1:5-naphtholsulphonic acid, thereby dyeing said regenerated cellulose materials in even level shades, said disazo dyestuffs being obtainable by tetrazotizing 1:5-naphthalene diamine and coupling with one molecular proportion of an azo dye coupling component from each of the two classes represented by R and R′.

12. In the dyeing of regenerated cellulose materials in even level shades, the process which comprises applying to said regenerated cellulose materials from a dyebath unsymmetrical disazo dyestuffs having the following structural formula

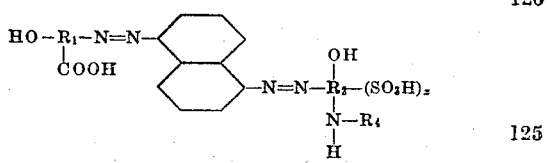

wherein $R_1$ represents a benzene residue, $R_2$ represents a naphthalene residue, $R_4$ represents hydrogen or a phenyl group and $x$ is one or two, said disazo dyestuff being free from coupled residues of 2-amino-5-naphthol-7-sulphonic acid, thereby dyeing said materials in even level shades.

13. In the dyeing of regenerated cellulose materials in even level shades, the process which comprises applying to said regenerated cellulose materials from a dyebath, disazo dyestuffs having the following structural formula

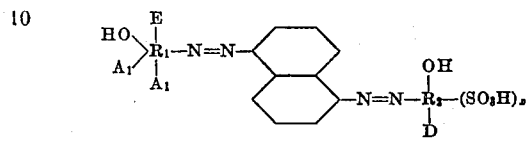

wherein $R_1$ and $R_2$ represent naphthalene residues, $A_1$ represents hydrogen or $SO_3H$, D and E represent hydrogen or an amino group, and $x$ is one or two, said dyestuff being free from coupled residues of 2-amino-5-naphthol-7-sulphonic acid and containing at least two sulphonic acid groups, thereby dyeing said materials in even level shades.

14. In the dyeing of regenerated cellulose materials in even level shades, the process which comprises applying to said regenerated cellulose materials from a dyebath unsymmetrical disazo dyestuffs having the following structural formula

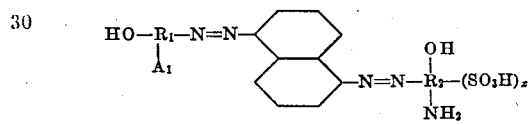

wherein $R_1$ represents a naphthalene residue, $A_1$ represents hydrogen or $SO_3H$ group, $R_2$ represents a naphthalene residue, and $x$ is one or two, said dyestuff being free from coupled residues of 2-amino-5-naphthol-7-sulphonic acid and containing two sulphonic acid groups, thereby dyeing said materials in even level shades.

15. In the dyeing of regenerated cellulose materials in even level shades, the process which comprises applying to said regenerated cellulose materials from a dyebath unsymmetrical disazo dyestuffs having the following structural formula

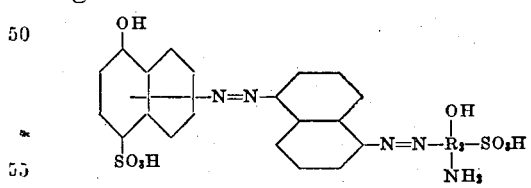

wherein $R_2$ represents a naphthalene residue, said dyestuff being free from coupled residues of 2-amino-5-naphthol-7-sulphonic acid, thereby dyeing said materials in even level violet shades.

16. In the dyeing of regenerated cellulose materials in even level shades, the process which comprises applying to said regenerated cellulose materials from a dyebath, disazo dyestuffs having the following structural formula

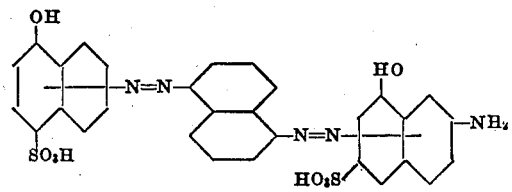

thereby dyeing said materials in even level violet shades.

17. In the dyeing of regenerated cellulose materials in even level shades, the process which comprises applying to said regenerated cellulose materials from a dyebath, symmetrical disazo dyestuffs having the following structural formula

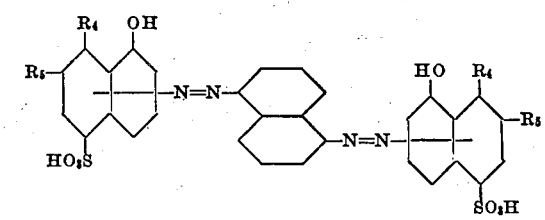

wherein $R_4$ represents hydrogen or an amino group and $R_5$ represents hydrogen or $SO_3H$, thereby dyeing said materials in even level shades.

18. In the dyeing of regenerated cellulose materials in even level shades, the process which comprises applying to said regenerated cellulose materials from a dyebath, disazo dyestuffs having the following structural formula

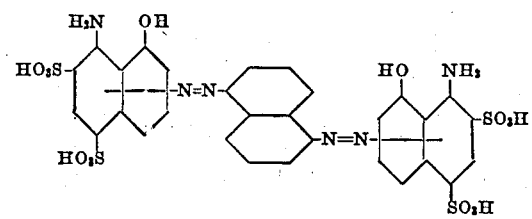

thereby dyeing said materials in even level bright blue shades.

19. In the dyeing of regenerated cellulose materials in even level shades, the process which comprises applying to said regenerated cellulose materials from a dyebath, disazo dyestuffs having the following structural formula

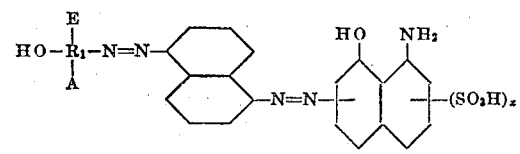

wherein $R_1$ represents a benzene or naphthalene residue, A represents hydrogen, COOH or $SO_3H$, E represents hydrogen or an amino group and $x$ is one or two, A and E being COOH and hydrogen, respectively when $R_1$ represents a benzene residue and A being hydrogen or $SO_3H$ when $R_1$ is a naphthalene residue, said dyestuff being free from coupled residues of 2-amino-5-naphthol-7-sulphonic acid, thereby dyeing said materials in even level shades.

In testimony whereof, I affix my signature.

RAINALD BRIGHTMAN.